Figure 1:
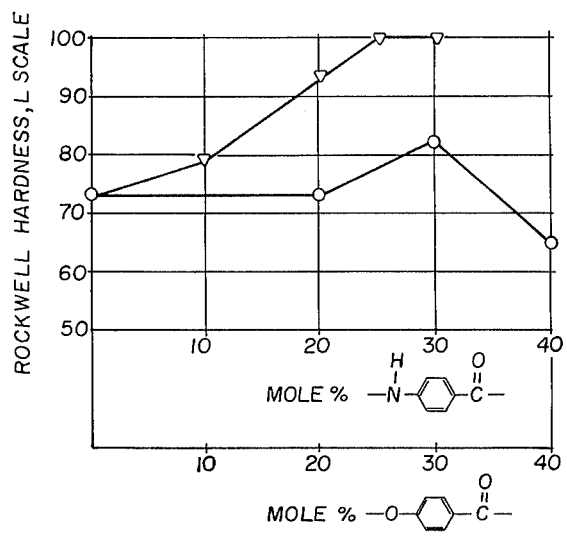

United States Patent [19]

Jackson et al.

[11] 4,182,842
[45] Jan. 8, 1980

[54] POLY(ESTER-AMIDES) PREPARED FROM AN AROMATIC DICARBOXYLIC ACID, ETHYLENE GLYCOL AND A P-ACYLAMINOBENZOIC ACID

[75] Inventors: Winston J. Jackson; Herbert F. Kuhfuss, both of Kingsport, Tenn.

[73] Assignee: Eastman Kodak Company, Rochester, N.Y.

[21] Appl. No.: 957,127

[22] Filed: Nov. 3, 1978

Related U.S. Application Data

[63] Continuation of Ser. No. 888,258, Mar. 20, 1978, abandoned, which is a continuation of Ser. No. 822,984, Aug. 8, 1977, abandoned.

[51] Int. Cl.² .............................................. C08G 63/18
[52] U.S. Cl. .................................... 528/292; 528/184; 528/191; 528/299
[58] Field of Search ............... 528/184, 191, 292, 299

[56] References Cited

U.S. PATENT DOCUMENTS

| | | | |
|---|---|---|---|
| 3,671,542 | 6/1972 | Kwolek | 260/30.8 R |
| 3,778,410 | 12/1973 | Kuhfuss et al. | 528/273 |
| 3,804,805 | 4/1974 | Kuhfuss et al. | 528/273 |
| 3,926,923 | 12/1975 | Preston | 528/348 |
| 4,035,356 | 7/1977 | Jackson et al. | 528/273 |
| 4,043,981 | 8/1977 | O'Brien | 528/191 |

*Primary Examiner*—Lucille M. Phynes
*Attorney, Agent, or Firm*—William P. Heath, Jr.; Daniel B. Reece, III

[57] ABSTRACT

Disclosed are poly(ester-amides) prepared from an aromatic dicarboxylic acid, ethylene glycol and a p-acylaminobenzoic acid. These poly(ester-amides) contain the following divalent radicals:

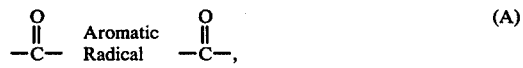

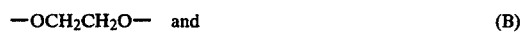

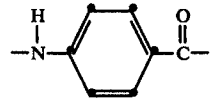

8 Claims, 2 Drawing Figures

POLY(ESTER-AMIDES) PREPARED FROM AN AROMATIC DICARBOXYLIC ACID, ETHYLENE GLYCOL AND A P-ACYLAMINOBENZOIC ACID

This application is a continuation of copending application Ser. No. 888,258 filed Mar. 20, 1978, which is a continuation of application Ser. No. 822,984 filed Aug. 8, 1977, both now abandoned.

This invention relates to poly(ester-amides) which exhibit unobvious mechanical properties.

The use of objects molded from synthetic polymers has expanded rapidly in the last several decades. In particular, polyesters and polyamides have widely gained acceptance for general molding applications. Although many polyesters and polyamides have mechanical properties suitable for general molding applications, most polyesters and polyamides are not suitable for high strength service because the mechanical properties are not sufficiently high. One group of polyesters and polyamides that are suitable for high strength service without the need of a reinforcing agent are a new class of polymers exhibiting a general overall balance of mechanical properties substantially enhanced over previous polymers. These polymers have been described by various terms, including "liquid crystalline", "liquid crystal", and "anisotropic". Briefly, the polymers of this new class are thought to involve a parallel ordering of the molecular chains. The state wherein the molecules are so ordered is often referred to either as the liquid crystal state or the nematic phase of the liquid crystal state. These polymers are prepared from monomers which are generally long, flat and fairly rigid along the long axis of the molecule and have chain extending linkages that are either coaxial or parallel.

Applicants have now invented poly(ester-amides) that exhibit mechanical properties sufficiently high to make the poly(ester-amides) suitable for various kinds of high strength service without the necessity of a reinforcing agent.

Very broadly, the poly(ester-amides) of this invention are comprised of the following divalent radicals:

$$\overset{O}{\underset{\|}{-C-}} \text{Aromatic Radical} \overset{O}{\underset{\|}{-C-}}, \quad (A)$$

—OCH₂CH₂O— and (B)

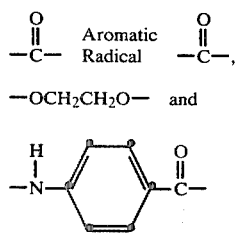 (C)

In this invention the range of radical (C) is from about 10 to about 35 mole percent, preferably about 25 to about 30 mole percent, based on the total moles of (A) and (C) combined.

Applicants believe the closest prior art to be U.S. Pat. No. 3,804,805 combined with prior art showing liquid crystal polyamides.

U.S. Pat. No. 3,804,805 discloses liquid crystal polyesters prepared from poly(ethylene terephthalate) and a p-acyloxybenzoic acid.

U.S. Pat. No. 3,671,542 discloses liquid crystal polyamides.

The polyesters of this invention are unobvious over the prior art because the hardness and heat deflection temperature of the poly(ester-amides) of this invention, containing the divalent radical

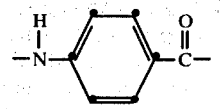

contributed from a p-acylaminobenzoic acid, are unobviously higher than the hardness and heat deflection temperature of corresponding polyesters disclosed in U.S. Pat. No. 3,804,805 containing the same mole percent of the divalent radical

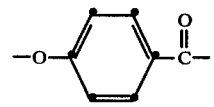

contributed from a p-acyloxybenzoic acid. Stated another way, the extent to which the hardness is enhanced is unexpected by substituting the

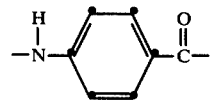

radical in the form of a divalent radical contributed from a p-acylaminobenzoic acid for the

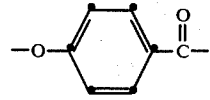

radical in the form of a divalent radical contributed from a p-acyloxybenzoic acid.

The precise manner in which the hardness and heat deflection temperature of the poly(ester-amides) of the invention are unobvious over the hardness and heat deflection temperature of the polyesters disclosed in U.S. Pat. No. 3,804,805 can be fully understood by a consideration of FIGS. 1 and 2.

FIG. 1 is a graph showing the relationship between the hardness of the poly(ester-amides) of the invention and the amount of divalent radical

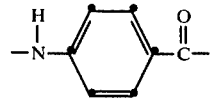

in the poly(ester-amides) and the hardness of the polyesters of the prior art and the amount of divalent radical

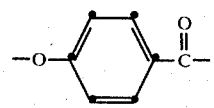

in the polyesters of the prior art. The hardness of the poly(ester-amides) of the invention is represented by the upper line connecting the triangular data points. The hardness of the polyesters of the prior art is represented by the lower line connecting the circular data points.

Figure 2:
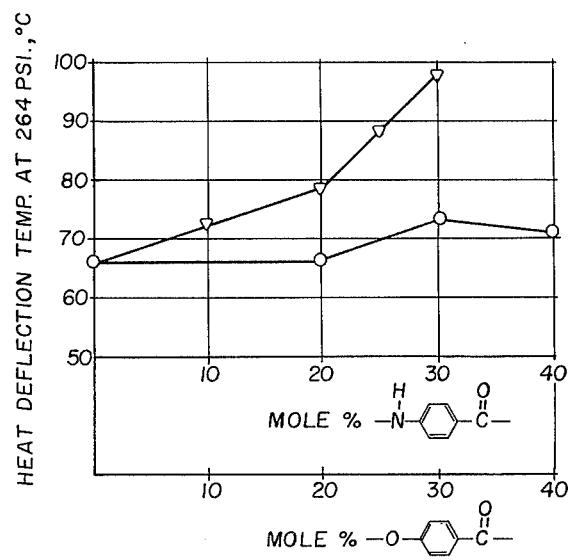

FIG. 2 is a graph similar to FIG. 1 showing the relationship between the heat deflection temperature of both polymers and the amount of each divalent radical.

In each of the Figures, a double abscissa has been used. On the upper abscissa, which corresponds to the upper line representing the poly(ester-amides) of the invention, there has been plotted the mole percent of divalent radical (C)

based on the total moles of radical (A) and radical (C) combined. On the lower abscissa, which corresponds to the lower line representing the polyesters of the the prior art, there has been plotted the mole percent of divalent radical

based on the total moles of the divalent contributed from the dicarboxylic acid and this radical combined. As will be understood from a consideration of both the upper and lower abscissas, the same scale has been used for the amount of each of the two divalent radicals. Thus, one can obtain a direct comparison between the poly(ester-amides) of the invention and the polyesters of the prior art, each containing the same amount of each of the two radicals.

On the ordinate of FIG. 1 there has been plotted the hardness, measured as Rockwell Hardness, L Scale, determined according to ASTM D785, Method A. On the ordinate of FIG. 2 there has been plotted the heat deflection temperature in degrees centigrade measured at 264 psi., determined according to ASTM D648.

The data used in the Figures to illustrate the poly(ester-amides) of the invention were obtained by preparing poly(ester-amides) from poly(ethylene terephthalate) and 0, 10, 20, 25 and 30 mole percent divalent radical

and determining the hardness and heat deflection temperature of each of the polymers. As a special example, the poly(ester amide) of the invention containing 25 mole percent of the radical contributed from a p-acylaminobenzoic acid was prepared by the following procedure.

A mixture of 144 g. (0.75 mole) of poly(ethylene terephthalate) (0.56 inherent viscosity) and 44.8 g. (0.25 mole) p-acetamidobenzoic acid is placed in a 500 ml flask equipped with a stirrer, a short distillation column, and an inlet for nitrogen. The flask is evacuated and purged three times with nitrogen before being lowered into a Wood's-metal bath maintained at 275° C. As the mixture is stirred at 275° C. in a nitrogen atmosphere, acetic acid distils from the flask. After 60 minutes, most of the acid has evolved and a low-melt viscosity melt is obtained. A vacuum of 0.5 mm is then applied at 275° C. and stirring is continued for four hours. A light amber, hazy, medium-melt viscosity polymer with an inherent viscosity of 0.40 is obtained. The polymer is ground to pass a 20-mesh screen and the inherent viscosity is increased by heating the particles under reduced pressure (0.05–0.1 mm Hg) at 180° C. for one hour, 220° C. for three hours, and 230° C. for ten hours. The resulting polymer has an inherent viscosity of 0.67.

The data used in the Figures to illustrate the polyesters of the prior art were obtained by preparing polyesters of the prior art using the disclosure of U.S. Pat. No. 3,804,805 from poly(ethylene terephthalate) and 0, 20, 30 and 40 mole percent divalent radical

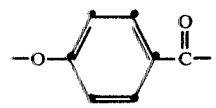

and determining the hardness and heat deflection temperature of each of the polymers.

The unobviously higher hardness of the poly(ester-amides) of the invention compared to the hardness of the polyesters of the prior art can be fully appreciated by a detailed consideration of the data reported in FIG. 1. For example, consider a typical polymer of the invention containing 25 mole percent of the divalent radical

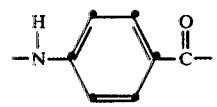

and a corresponding polyester of the prior art containing 25 mole percent radical

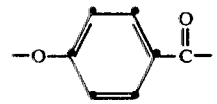

The hardness of the polyester of the prior art is around 77, while the hardness of the poly(ester-amide) of the invention is 99, which is a substantial increase over the prior art.

In a similar manner, the unobviously high heat deflection temperature of the poly(ester-amides) of the invention compared to the heat deflection temperature of the polyesters of the prior art can be fully appreciated by considering the data reported in FIG. 2. For example, the heat deflection temperature of a polyester of the prior art containing 30 mole percent of the radical

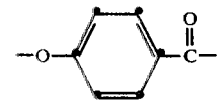

is 73° C., while the heat deflection temperature for the corresponding poly(ester-amide) of the invention containing 30 mole percent of the radical

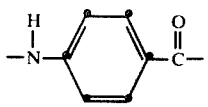

is 97° C., a substantial increase.

Very broadly, the poly(ester-amides) of this invention are prepared by a process which is similar to that disclosed in U.S. Pat. No. 3,804,805 and U.S. Pat. No. 3,778,410 and is composed of two steps.

The first step of the process comprises preparing a fragmented poly(ester-amide) by contacting a p-acylaminobenzoic acid with a starting polyester having an inherent viscosity of at least about 0.1, preferably 0.15. The second step of the process comprises preparing the poly(ester-amide) of the invention by increasing the inherent viscosity of the fragmented poly(ester-amide) to at least 0.4. Optionally the inherent viscosity can be further increased by solid state polymerization. The starting polyester is formed from a dicarboxylic acid and ethylene glycol and consequently contains repeating units composed of the divalent radical remaining after the removal of the hydroxyl groups from the dicarboxylic acid, which is attached to the divalent radical remaining after removal of the hydrogen atoms from the ethylene glycol. Upon contact, the starting polyester and p-acylaminobenzoic acid react by acidolysis to form the fragmented poly(ester-amide). The inherent viscosity of the fragmented poly(ester-amide) is increased to form the poly(ester-amide) of the invention comprised of three kinds of divalent radicals. The first divalent radical, herein designated radical (A), comes from the dicarboxylic acid portion of the starting polyester and is the divalent radical remaining after the removal of the hydroxyl groups from the dicarboxylic acid. The second divalent radical, herein designated radical (B), comes from the ethylene glycol portion of the polyester and is the divalent radical remaining after removal of the hydrogen atoms from the ethylene glycol. The third divalent radical, herein designated radical (C), comes from the p-acylaminobenzoic acid and is the divalent radical remaining after removal of the acyl and hydroxy groups from the p-acylaminobenzoic acid.

The starting polyester is comprised of repeating units corresponding to the formula $$-\overset{O}{\overset{\|}{C}}-R_1-\overset{O}{\overset{\|}{C}}-O-CH_2CH_2-O-$$

where $R_1$ is 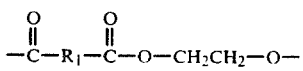 or

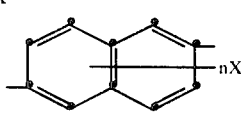

wherein X is O, Cl—, Br—, or a monovalent alkyl radical having one to three carbon atoms and n is 1 or 2.

$R_1$ will be recognized as the divalent radical remaining after removal of the carboxylic groups from the dicarboxylic acid used to prepare the starting polyester. Examples of dicarboxylic acids that can be used to prepare the starting polyester include terephthalic acid, 2-methyl terephthalic acid, 2-propyl terephthalic acid, 2-chloro terephthalic acid, dibromo terephthalic acid, 2,6-naphthalenedicarboxylic acid, 4-methyl-2,6-naphthalenedicarboxylic acid, 1-chloro-2,6-naphthalenedicarboxylic acid, and the like. Terephthalic acid is preferred.

The starting polyesters of this invention can be prepared by conventional processes well known in the art, such as direct esterification or ester interchange, followed by polycondensation. Preferably, the starting polyester is prepared by an ester interchange procedure whereby a dialkyl ester of the dicarboxylic acid, such as dimethyl terephthalate, is reacted with ethylene glycol under the influence of heat to form bis 2-hydroxyethyl-terephthalate which is then polycondensed under high temperature and low pressure to form a high molecule weight polyester.

The p-acylaminobenzoic acid that reacts with the starting polyester and contributes radical (C) in the final poly(ester-amide) corresponds to the structure

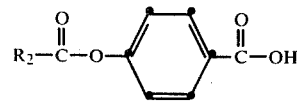

wherein $R_2$ is phenyl or a monovalent alkyl radical of 1 to 8, preferably 1 to 4, carbon atoms. Preferably, $R_2$ is a monovalent alkyl radical having one carbon, in which case the p-acylaminobenzoic acid is p-acetamidobenzoic acid.

The p-acylaminobenzoic acids can be prepared by conventional processes, such as reaction of p-aminobenzoic acid with an acyl halide or an anhydride.

The thermodynamic conditions that can be used in the first step of preparing the fragmented polyester by contacting the starting polyester with a p-acylaminobenzoic acid acid can vary widely depending on the desires of the practitioner of the invention. Although other temperatures can be used, the starting polyester and the p-acylaminobenzoic acid can be contacted within a temperature range of about 250° C. to about 300° C., preferably within the temperature range of 270° C. to 280° C. Temperatures higher than about 300° C. can be undesirable since temperatures this high may cause degradation of the polymer. Temperatures below about 250° C. can be undesirable since the reaction rate between the p-acylaminobenzoic acid and the starting polyester will be lowered. A wide variety of pressures can be used to prepare the copolyester prepolymers. Atmospheric pressure is typically used during the first step of the process. A wide variety of times can be used to prepare the copolyester prepolymer. Of course, the starting polyester and the p-acylaminobenzoic acid must be in contact for a long enough period of time to react to form the copolyester prepolymer.

The p-acylaminobenzoic acid can be contacted with the starting polyester using a wide variety of methods well known in the art. In most instances the starting polyester and p-acylaminobenzoic acid are solids at standard temperature and pressure. In this instance the two solids can be mixed and heated until molten. In other instances the starting polyester and acylaminobenzoic acid can be in liquid form, in which case the two liquids can be contacted by admixing the liquids.

As noted above, the second step of the process involves increasing the inherent viscosity of the fragmented poly(ester-amide) to at least 0.4 to form the poly(ester-amide) of the invention which is suitable for forming into useful articles. The increase in inherent viscosity of the fragmented poly(ester-amide) can be accomplished by any one of several conventional methods well known in the art to build up the molecular weight of linear polyesters. When the fragmented poly(ester-amide) is a hot, molten material, the fragmented poly(ester-amide) can be conveniently built up by a technique similar to the polycondensation step in the production of poly(ethylene terephthalate). In this technique a subatmospheric pressure is created above the fragmented poly(ester-amide) and the fragmented poly(ester-amide) is heated while polycondensation products are removed overhead. The fragmented poly(ester-amide) can be stirred if desired. Preferably, the inherent viscosity of the poly(ester-amide) of the invention is further increased higher than 0.4 using fluidization techniques which are well known in the art and are routinely used to build up the molecular weight of poly(ethylene terephthalate).

In addition to the hardness and heat deflection temperature of the poly(ester-amide) of the invention being unobvious over the polyesters of the prior art, many other properties of the poly(ester-amide) of the invention are unobvious over the properties of the copolyester of the prior art. To illustrate several of these unobvious properties, test bars of the poly(ester-amide) of the invention containing 25 mole percent of the radical contributed from p-acetamidobenzoic acid were molded and tested and the properties compared with a similar copolyester of the prior art. In this work, the poly(ester-amide) is injection molded at 260° C. to give $2\frac{1}{2} \times \frac{3}{8} \times 1/16$ inch tensile bars and $5 \times \frac{1}{2} \times \frac{1}{8}$ inch flexure bars for testing. ASTM procedures are used for measuring the tensile strength (ASTM D1708) and flexural modulus (ASTM D790). Data are not available for the similar copolyester prepared from poly(ethylene terephthalate) and 25 mole percent p-acetoxybenzoic acid, but it is available for the 30 mole percent modification. The comparative properties are given in the table below. It is believed that the level of properties of the copolyester prepared with 25 mole percent p-acetoxybenzoic acid will be appreciably lower.

|  | Modifier of Poly(ethylene terephthalate) | |
| --- | --- | --- |
|  | 25 Mole % p-Acetamidobenzoic Acid | 30 Mole % p-Acetoxybenzoic Acid |
| Tensile Strength, psi. | 24,400 | 17,000 |
| Flexural modulus, $10^5$ psi. | 7.6 | 5.8 |
| Oxygen index | 29 | 24 |

The inherent viscosity of the poly(ester-amide) of this invention is at least 0.4, but can vary widely upward from 0.4. In one embodiment the inherent viscosity of the poly(ester-amide) is at least 0.5. The inherent viscosity of the poly(ester-amide) can, if desired, be increased still further to an inherent viscosity of 0.6, 0.7, 1.0, or even higher, using techniques well known in the art for increasing the molecular weight of linear polyesters such as solid-state polymerization at 210 to 230° C. under reduced pressure or in a fluidized bed.

The inherent viscosity of the poly(ester-amide) of this invention and the poly(ethylene terephthalate) used to prepare the poly(ester-amide) of this invention is measured at 25° C. using 0.50 gram of polymer per 100 ml. of a solvent composed of 60 volumes of phenol and 40 volumes of tetrachloroethane.

The poly(ester-amides) of this invention are useful for preparing molded objects, films, fibers and the like.

The poly(ester-amides) of this invention are used to prepare useful articles using conventional methods and conventional apparatus. For instance, the poly(ester-amides) can be formed into fibers by conventional melt spinning techniques and subsequently drafted, heatset and further processed according to techniques well known in the art. The poly(ester-amides) can be injection molded using conventional equipment and techniques.

The poly(ester-amides) of this invention also may contain nucleating agents, fillers, pigments, glass fibers, asbestos fibers, antioxidants, stabilizers, plasticizers, lubricants, fire-retardants, and other additives.

We claim:
1. A process comprising
(1) preparing a fragmented poly(ester-amide) by contacting within a temperature range of about 250° to about 300° C.
   (A) a starting polyester having an inherent viscosity of at least about 0.2 comprised of divalent radicals corresponding to the formula

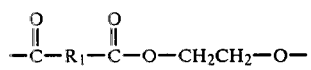

wherein $R_1$ is 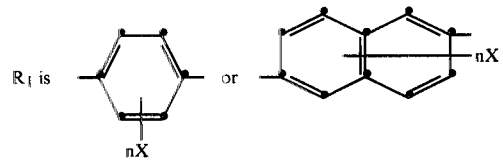

wherein X is Cl—, Br—, or a monovalent alkyl radical having one to three carbon atoms and n is 0, 1 or 2, and
   (B) from about 10 to about 35 mole percent, based on the total moles of p-acylaminobenzoic acid and

combined, a p-acylaminobenzoic acid corresponding to the formula

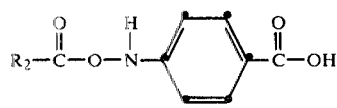

wherein $R_2$ is phenyl or a monovalent alkyl radical of 1 to 8 carbon atoms, and (2) preparing a final poly(ester-amide) having an inherent viscosity of at least 0.4 by increasing the inherent viscosity of the fragmented polyester by exposing the fragmented polyester to a suitable pressure and a suitable temperature.

2. The process of claim 1 wherein $R_1$ is 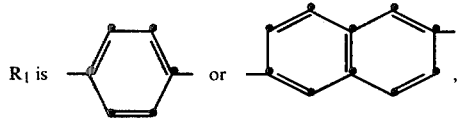, the range of p-acylaminobenzoic acid is 25 to 30 mole percent, and $R_2$ is a monovalent alkyl radical having 1 to 4 carbon atoms.

3. The process of claim 2 wherein step (1) is conducted within a temperature range of 270° C. to 280° C.

4. The process of claim 3 wherein $R_1$ is 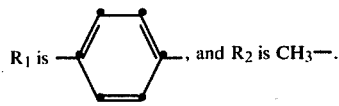, and $R_2$ is $CH_3$—.

5. Product of the process of claim 1.
6. Product of the process of claim 2.
7. Product of the process of claim 3.
8. Product of the process of claim 4.